Figure 1:
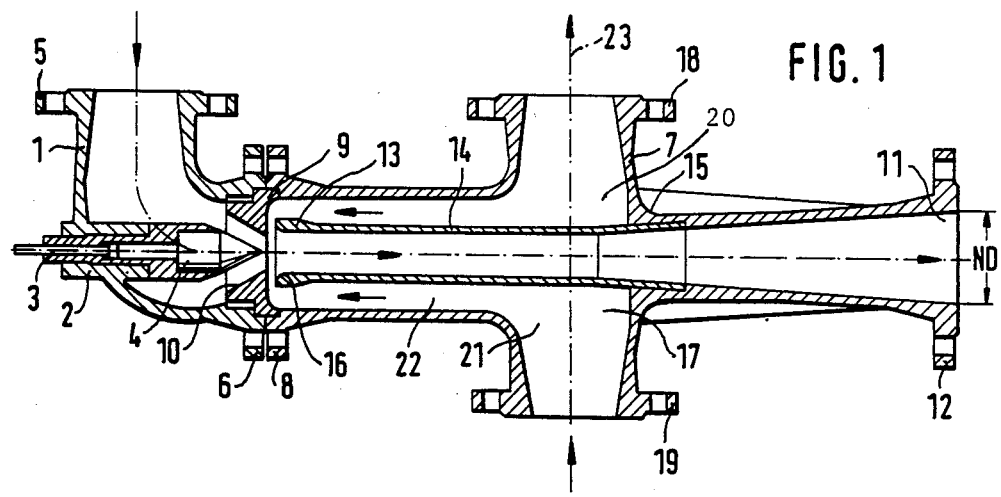

United States Patent [19]

Ehrhardt

[11] Patent Number: 4,846,617
[45] Date of Patent: Jul. 11, 1989

[54] JET PUMP, IN PARTICULAR FOR HOT-WATER HEATING SYSTEMS WITH RETURN-FLOW MIXING

[75] Inventor: Gerd Ehrhardt, Aachen, Fed. Rep. of Germany

[73] Assignee: Mr. Helmut Bälz, Heibronn, Fed. Rep. of Germany

[21] Appl. No.: 718,827

[22] Filed: Apr. 4, 1985

Related U.S. Application Data

[63] Continuation of Ser. No. 474,584, filed as PCT DE82/00125 on Jun. 12, 1982, published as W083/00196 on Jan. 20, 1983, abandoned.

[30] Foreign Application Priority Data

Jun. 30, 1981 [DE] Fed. Rep. of Germany ....... 3125583

[51] Int. Cl.⁴ .............................. F04F 5/48
[52] U.S. Cl. ........................ 417/187; 237/6; 237/8 C; 417/151; 417/192
[58] Field of Search ............... 237/6, 67, 59, 64, 8 C; 417/185–188, 151, 192

[56] References Cited

U.S. PATENT DOCUMENTS

| | | | |
|---|---|---|---|
| 333,086 | 12/1885 | Strickland | 417/151 |
| 885,224 | 4/1908 | Buehler | 417/192 |
| 1,092,570 | 4/1914 | Gold | 237/6 |
| 1,693,101 | 11/1928 | Worthington . | |
| 1,779,009 | 10/1930 | Negro | 417/187 X |
| 1,987,883 | 1/1935 | White et al. | 417/187 X |
| 2,255,904 | 9/1941 | Smith | 237/6 |
| 2,357,266 | 8/1944 | Malcolm | 417/187 |
| 2,909,127 | 2/1959 | Bradaska . | |
| 4,183,722 | 1/1980 | Roeder . | |

FOREIGN PATENT DOCUMENTS

| | | |
|---|---|---|
| 0020872 | 2/1972 | European Pat. Off. . |
| 15243 | 6/1880 | Fed. Rep. of Germany . |
| 488231 | 12/1929 | Fed. Rep. of Germany . |
| 1752690 | 9/1957 | Fed. Rep. of Germany . |
| 2225263 | 5/1972 | Fed. Rep. of Germany . |
| 2342841 | 3/1975 | Fed. Rep. of Germany . |

Primary Examiner—Edward K. Look
Attorney, Agent, or Firm—Frishauf, Holtz, Goodman & Woodward

[57] ABSTRACT

A jet pump, in particular for hot-water heating systems or water-heating systems with return-flow mixing has a feeder head which is connected with a housing containing the receptor nozzle 13. The housing (7) contains a mixing tube (14) which is connected via a diffuser if needed with a second line connection (12), is coaxial with an injector nozzle (10) and adjoins the receptor nozzle (13); the mixing tube (14) also extends longitudinally through a chamber (22) of the housing in which at least a third line connection (18) and, if desired, a fourth line connection (19), directed respectively transversely to the mixing tube, discharges.

In order to attain, e.g., a substantially reduced operating noise and simultaneously increased efficiency, the discharge opening(s) (20, 21) of the third and, if needed, a fourth line connection (18, 19) are disposed spaced laterally apart from the injector nozzle (10); and a portion of housing chamber, which is embodied in the form of an elongated annular conduit (22) and surrounds the mixing tube (14) is located between the discharge openings (20, 21) of the third (and fourth) line connections (18, 19) and the injector nozzle (10).

22 Claims, 1 Drawing Sheet

U.S. Patent

Jul. 11, 1989

4,846,617

JET PUMP, IN PARTICULAR FOR HOT-WATER HEATING SYSTEMS WITH RETURN-FLOW MIXING

This application is a continuation of application Ser. No. 474,584, filed as PCT DE82/00125 on Jun. 12, 1982, published as WO83/00196 on Jan. 20, 1983, now abandoned.

The invention relates to a jet pump, especially suitable for heating systems using hot water and particularly for hot water heating systems which have return-flow mixing. A jet pump has been proposed which has a feeder head having a first line connection for the injector feeder head having a first line connection for the injector stream as well as guide means if needed for an adjusting device cooperating with the injector nozzle; the feeder head communicates with a housing which includes the receptor nozzle. The housing includes a mixing tube which is coaxial with the injector nozzle and which adjoins the receptor nozzle. The mixing tube comunicates as needed, via a diffuser, with a second line connection and extends through a chamber in the housing into which at least one third line connection discharges, this third line connection being directed transversely with respect to the mixing tube.

A controllable jet pump having these characteristics is known from German Patent Disclosure Document DE-OS No. 2 920 923. In the hot-water heating system or water-heating system described there, the feeder head is connected to the primary supply line via the first line connection, and the supply line on the consumer side branches off from the second line connection associated with the diffuser. The primary and consumer-side return-flow lines, respectively, are connected with the third and fourth line connections. In contrast to the three-way jet pump usually used as a mixing device in hot-water heating or water-heating systems of the above kind, the advantage is attained that a separate mixture line branching off from the return-flow line is dispensed with, thus making installation simpler; on the other hand, the danger that degassing phenomena may occur in the admixed water in the jet pump is reduced to a minimum.

In the known jet pump, the line connections communicating with the primary and secondary return-flow lines discharge in the housing directly in the vicinity of the injector and receptor nozzles, so that the transverse stream flowing through these line connections directly crosses the injector stream before that stream enters the receptor nozzle. In practice, it has been found that the noise buildup in this jet pump cannot be reduced below a certain lower limit, which in certain applications is undesirably high. It is also possible that an undesirable turbulence may occur in the injector stream, causing heat losses.

It is an object to improve the jet pump of the general type discussed above in such a way that the noise buildup is substantially decreased while, simultaneously, high efficiency and low heat loss is obtained.

Briefly, the discharge opening of the third and, if needed, a fourth line connection is disposed at a distance laterally from the injector nozzle, and a portion of the housing chamber surrounding the mixing tube and taking the form of an elongated annular conduit is located between the discharge openings and the injector nozzle.

The annular conduit embodies a mixing-water supply conduit, by way of which the water to be admixed flows along the outer wall of the mixing tube to the receptor nozzle. The length of this conduit is dimensioned such that any turbulence which may have arisen at the inlet of the return-flow line on the consumer side will have substantially subsided by the time of entry into the receptor nozzle.

As practical experience has shown, the new jet pump is distinguished by a minimal buildup of noise, and its efficiency is greater than that of conventional jet pumps of comparable dsign.

Particularly simple structural features are attained if the mixing tube is embodied in one piece with the receptor nozzle; however, the apparatus may also be such that the receptor nozzle is mounted onto the cylindrical mixing tube.

In order to assure a substantial calming of the flow conditions in the vicinity of the entry into the receptor nozzle, it has proved to be advantageous for the distance between the receptor nozzle and the axis of the third line connection to be equal to between 3 and 4 times the nominal diameter of the second line connection, preferably 3.3 times this diameter. The inside diameter of the cylindrical mixing tube is advantageously equal to from 0.4 to 0.6 times the nominal diameter of the second line connection and preferably 0.5 times this diameter, while it has proved to be efficacious for the length of the mixing tube to be equal to from 3 to 5 times and preferably 3.7 times the nominal diameter of the second line connection.

The distance between the injector nozzle and the receptor nozzle is advantageously equal to from 0.1 to 0.3 times, and preferably 0.16 times, the nominal diameter of the second line connection. Finally, it has proved to be advantageous for the outer diameter of the annular conduit to be from 1 to 1.5 times and preferably 1.25 times the nominal diameter of the second line connection, and for the diffuser to have a total opening angle from 5° to 9° and preferably 7°.

In a preferred form of embodiment, the jet pump is controllable, being driven with an adjusting device which influences the effective flow cross section of the injector nozzle. The low noise and the efficiency of this jet pump are further promoted because the adjusting device is a smoothwalled regulating cone and the injector nozzle has a conical profiled shape. The base diameter of the regulating cone is advantageously equal to from 0.4 to 0.6 and preferably 0.5 times the nominal diameter of the second line connection, while the opening or conical angle of the regulating cone amounts to from 40° to 60° and preferably 50°.

The opening diameter of the conical injector nozzle is larger by up to 20° and preferably by 10° than that of the regulating cone, and the axial length of the injector nozzle is equal to from 0.4 to 0.6 times, and preferably 0.5 times, the nominal diameter of the second line connection.

In order to make the jet pump usable in various applications, it is efficacious for the injector nozzle to be replaceable. The injector nozzle, embodied in disk-like fashion, can then be disposed between the feeder head and the housing.

Finally, with a view to low noise, it has also proved to be advantageous for the radius of curvature of the interceptor nozzle to be equal to from 0.2 to 0.3 times, and preferably 0.25 times, the nominal diameter of the second line connection.

Drawing

One exemplary embodiment of the subject of the invention is shown.

Figure 2:
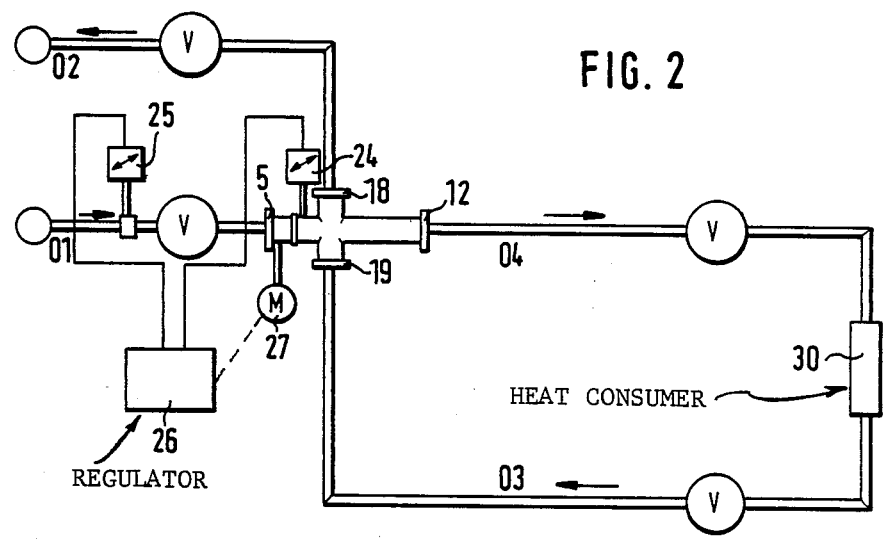

FIG. 1 shows a jet pump according to the invention, in an axial section and viewed from the side; and FIG. 2 shows a hot-water heating system having the jet pump of FIG. 1, in a schematic representation.

The jet pump shown in FIG. 1 has a feeder head 1, in which a guide 2 for the spindle 3 of a regulating cone 4 is provided. The feeder head 1 is embodied in principle in the manner of a bent pipe and has two connection flanges 5, 6, of which the connection flange 5 embodies a first line connection for a supply line.

By means of the other flange 6, the feeder head 1 is connected with a housing 7 embodied similarly to a cross-flow type valve housing, and the housing 7 has a connection flange 8 which is screwed on the flange 6 of the feeder head 1. A disk-like nozzle body 9 is clamped between the feeder head 1 and the housing 7, and a conical injector nozzle 10 oriented coaxially with the regulating cone 4 is disposed in this nozzle body 9.

The housing 7 has a diffuser 11 which is coaxial with the injector nozzle 10 and has a second line connection 12 for the supply line on the consumer side; the nominal diameter of the diffuser 11 is marked ND. A receptor nozzle 13 is disposed in the housing 7 behind and coaxial with the injector nozzle 10 and is adjoined by a cylindrical mixing tube 14, which in turn merges via a diffuser part 15 with the diffuser 11. The receptor nozzle 13, in the exemplary embodiment shown, is molded in one piece onto the mixing tube 14; however, forms of embodiment in which the receptor nozzle 13 is mounted onto the mixing tube 14 are also conceivable. The radius of curvature, at 16, on the trumpetshaped inlet of the receptor nozzle 13 is equal to from 0.2 to 0.3 times, preferably 0.25 times, the nominal diameter ND of the second line connection at 12, while the distance from the receptor nozzle 13 to the injector nozzle 10 is equal to from 0.1 to 0.3 times and preferably 0.16 times the nominal diameter ND.

The mixing tube 14 extends through a housing chamber 17, with which two line connections 18, 19 which are coaxial with one another communicate; the line connection 18 is the third line connection, and the line connection 19 is the fourth line connection.

The two line connections 18, 19 are directed transversely with respect to the axis of the mixing tube 14, and in the present instance are at right angles thereto. As noted, they are disposed coaxially with one another; however, forms of embodiment in which the axes of the two line connections 18, 19 between them define a right angle, for instance, are also conceivable.

As may be seen in FIG. 1, the discharge openings 20, 21 of the two line connections 18, 19 are disposed spaced apart laterally from the injector nozzle 10, and an elongated annular conduit 22 is formed between the discharge openings 20, 21 and the injector nozzle 10. When the jet pump is used in heating systems using hot water or in systems for heating water, this annular conduit serves as a mixing-water supply conduit and surrounds the mixing tube 14 on all sides.

Detailed theoretical and practical tests of the described jet pump have shown that particularly favorable conditions in terms of efficiency and low noise are attained if the distance between the receptor nozzle 13 and the axis 23 of the two line connections 18, 19 is equal to from 3 to 4 and preferably 3.3 times the nominal diameter ND. The inside diameter of the cylindrical mixing tube 14 is equal to from 0.4 to 0.6 and preferably 0.5 times the nominal diameter ND, while its length is equal to from 3 to 5 times, preferably 3.75 times, the nominal diameter ND. The outer diameter of the annular conduit 22 is equal to from 1 to 1.5 times the nominal diameter ND, and preferably 1.25 times that diameter.

The regulating cone 4 is embodied as a smooth-walled cone, the base diameter of which is equal to from 0.4 to 0.6 and preferably 0.5 times the nominal diameter ND, while its opening or conical angle amounts to from 40° to 60°, and preferably 50°.

The opening angle of the replaceable conical injector nozzle 10 is larger than that of the regulating cone 4 by up to 20° and preferably by 10°; the axial nozzle length is equal to from 0.4 to 0.6 times, preferably 0.5 times, the nominal diameter ND.

Finally, the diffuser 11 and the diffuser part 15 of mixing tube 14 have a total opening angle of from 5° to 9°, preferably 7°.

The use of the jet pump in a hot-water heating system or a water-heating system will now be described, referring to FIG. 2:

The primary or mains-side supply line 01 is connected to the first line connection 5 of the feeder head 1, while the supply line 04 on the consumer side is connected at the diffuser outlet with the second line connection 12. The consumer-side supply line 04 leads to a consumer 30, which is connected via the consumer-side return-flow line 03 with the fourth line connection 19 of the jet pump. Finally, the primary or mains-side return-flow line 02 branches off from the third line connection 18. As is natural for such a system, additional shutoff and safety fixtures are located in the individual supply and return-flow lines but are not addressed in detail here.

During operation, a portion of the cooled water returning via the return-flow line 03 is directed as mixing water into the receptor nozzle 13 via the mixing-water supply conduit 22 in accordance with the position of the regulating cone 4, and is thereby admixed with the primary supply water which acts as impelling water. Since the pressure in the consumer-side return-flow line 03 and thus in the mixing-water supply conduit 22 as well is always higher than that in the primary return-flow line 02, cavitation phenomena cannot occur in the housing 7.

If the consumption of heat at the consumer 30 is throttled down severely, such as when the thermostatic valves in a central-heating system close, the admixture drops at first, until finally the flow velocity in the mixing-water supply conduit 22 becomes equal to zero. A further closure of the thermostatic valves then effects so-called 'tilting' of the jet pump. In that condition, a portion of the amount of impelling water flows out of the injector nozzle 10, through the mixing-water supply conduit 22 and into the primary return-flow line 02. If full tilting occurs, that is, if the supply line 04 on the consumer side is completely closed, the entire quantity of impelling water flows through the mixing-water supply conduit 22 directly into the primary return-flow line 02.

The tilting of the jet pump can be monitored and prevented in a simple manner by measuring the temperature in the mixing-water supply conduit 22. To this end, a temperature sensor 24 is provided in the mixing-water supply conduit 22, which, like a temperature sensor 25 located in the primary supply line 01, emits a temperature signal to a regulator 26, which triggers a servomotor 27 that is coupled with the spindle 3 of the regulating cone 4.

The two temperature sensors 24, 25 may also be contact thermometers.

If the temperature in the mixing-water supply conduit 22 rises up to a value which is just below the temperature in the supply line 01 as measured by the temperature sensor 25, the regulator 26 causes the servomotor 27 to drive the regulating cone 4 into the injector nozzle 10. As a consequence of the throttled impelling-water cross section, the admixture increases, and the temperature in the mixing-water supply conduit 22 immediately drops rapidly, whereupon the servomotor 27 comes to a stop or—if the consumer-side supply line 04 is blocked completely—causes the complete blockage of the injector nozzle 10.

The first line connection 5 may, as shown in FIG. 1, be embodied such that it widens or expands in the manner of a diffuser in the flow direction. This provision serves to reduce pressure losses. In a similar manner, the fourth line connection 19 is likewise embodied as widening in the flow direction, in order to reduce the pressure losses caused by the branching of the flow. In contrast to this, the third line connection 18 is embodied of the reducing-type in the flow direction, with the result that the nominal dimension again pertains at the connection point for the line flange.

In the described exemplary embodiment, the jet pump is used in a hot-water heating system with return-flow mixing. In principle, the use of this jet pump is also possible for other purposes in heating or process technology, for the mixing of flows or the like, whenever it is important to attain jet pump operation that is as quiet as possible yet highly efficient. In such applications, for instance when the jet pump is used as a mixer, one line connection may also be dispensed with (for instance, line connection 18). A connection is also conceivable where the medium to be admixed is aspirated or supplied via both line connections 18, 19. In all these cases the important feature is that a 180° reversal of the aspirated flow exists at the end of the annular conduit 22 at the entry into the receptor nozzle 13.

Applications also exist in which the described regulation of the jet pump can be dispensed with and where it is sufficient to establish the correct operating characteristics by setting the dimension of the injector nozzle cross section appropriately once and for all.

Finally, the jet pump may be operated not only with water but also with any other fluid medium, such as oil, and so forth.

I claim:

1. In a hot-water heating system,
    a low-noise water jet pump having
    a housing (7);
    a water feeder head (1) secured to the housing;
    a first line connection (5), connected to the feeder head and receiving hot water under pressure and conducting the pressurized hot water to the feeder head (1);
    a water injector nozzle (10) located in the housing, and communicating with the feeder head to provide an injector stream;
    a water receptor nozzle (13) located in the housing;
    a cylindrical water mixing tube (14) located in the housing, coaxial with the injector nozzle (10) and the receptor nozzle (13);
    a second line connection (12) to supply hot water to a heat consumer (30), formed in the housing, coaxial with and joined to the mixing tube for discharging mixed water and having a predetermined nominal diameter (ND);
    third and fourth water line connections (18, 19) extending into the interior of the housing, and having discharge openings (20, 21) positioned to direct fluid transversely with respect to the injector stream into the housing for receiving return water from the heat consumer to be mixed with the pressurized hot water, for recycling to the heat consumer and drainage of excess water;
    wherein the third line connection (18) and the fourth line connection (19) are coaxial, and positioned for communicating directly with the interior of the housing in a region surrounding the mixing tube (14),
    the axes of the discharge openings (20, 21) of the third and fourth line connections (18, 19) intersecting the mixing tube (14) and being spaced apart from the receptor nozzle (13) by a distance from the receptor nozzle (13) of about 3–4 times the predetermined nominal diameter (ND) of the second line connection.

2. A jet pump as defined by claim 1, characterized in that the water mixing tube (14) and the water receptor nozzle (13) form a unitary structure.

3. A jet pump as defined by claim 1, characterized in that the water receptor nozzle (13) is secured to the water mixing tube (14).

4. A jet pump as defined by claim 1, characterized in that the distance between the receptor nozzle (13) and the axes (23) of the discharge opening of the third and fourth line connections (18, 19) is equal to about 3.3 times, the nominal diameter (ND) of the second line connection (12).

5. A jet pump as defined by claim 1, characterized in that the inside diameter of the cylindrical water mixing tube (14) is equal to from 0.4 to 0.6 times, preferably 0.5 times, the nominal diameter (ND) of the second line connection (12).

6. A jet pump as defined by claim 1, wherein the water mixing tube has a diffuser (15) and the length of the mixing tube (14) between the receptor nozzle (13) and the diffuser (15) is equal to from 3 to 5 times, preferably 3.7 times, the nominal diameter (ND) of the second line connection (12).

7. A jet pump as defined by claim 1, characterized in that the distance between the injector nozzle (10) and the receptor nozzle (13) is equal to from 0.1 to 0.3 times, preferably 0.16 times, the nominal diameter (ND) of the second line connection (12).

8. A jet pump as defined by claim 1, characterized in that the third line connection comprises an annular conduit; and
    the diameter of the annular conduit (22) is equal to from 1 to 1.5 times, preferably 1.25 times, the nominal diameter (ND) of the second line connection (12).

9. A jet pump as defined by claim 1, characterized in that the mixing tube has an expanding portion at the end thereof adjacent the second line connection (12) forming a diffuser; and
    the diffuser has a total opening angle of from 5° to 9°, preferably approximately 7°.

10. A jet pump as defined by claim 1, characterized by a control valve (3, 4) to control flow of water from the first line connection;

said valve being controllably driven by an adjusting device (3; 4; 26) influencing the effective flow cross section of the injector nozzle (10).

11. A jet pump as defined by claim 10, characterized in that the valve is a smooth-walled regulating cone (4), and the injector nozzle (10) has a conical profiled shape.

12. A jet pump as defined by claim 11, characterized in that the diameter of the regulating cone (4) at the base is equal to from 0.4 to 0.6 times, preferably 0.5 times, the nominal diameter (ND) of the second line connection (12).

13. A jet pump as defined by claim 11 characterized in that the conical angle of the regulating cone (4) is from 40° to 60° and is preferably approximately 50°.

14. A jet pump as defined by claims 11 characterized in that the opening angle of the injector nozzle (10) is larger by up to 20°, preferably 10°, than the conical angle of the regulating cone (4).

15. A jet pump as defined by claim 14, characterized in that the axial length of the injector nozzle (10) is equal to from 0.4 to 0.6 times, preferably 0.5 times, the nominal diameter (ND) of the second line connection (12).

16. A jet pump as defined by claim 10, characterized in that the adjusting device (4) includes a servomotor (27), controlling flow in accordance with the difference of the temperature prevailing in the annular conduit (22) and the temperature of the primary supply flow (01) in the first line connection, the adjusting device (4) being controlled for automatic adjustment in the closing direction by the servomotor if the temperature difference drops below a predetermined level.

17. A jet pump as defined by claim 1, characterized in that the injector nozzle (10) is disposed on a nozzle body (9) of disk-like shape, located between the feeder head (1) and the housing (7).

18. A jet pump as defined by claim 1, characterized in that the radius of curvature of the receptor nozzle (13) is equal to from 0.2 to 0.3 times, preferably 0.25 times, the nominal diameter (ND) of the second line connection (12).

19. A jet pump ad defined by claim 1, characterized in that the first line connection (5) comprises a diffuser-like expansion in the flow direction.

20. A jet pump as defined by claim 1, wherein the fourth line connection (18) is shaped and positioned symmetrically with respect to the third line connection (19) in relation to a center line passing through said nozzles (10, 13) and said mixing tube (14).

21. A jet pump as defined by claim 1, wherein the third line connection (19) comprises a diffuser-like expander, in the direction of flow through the third line connection.

22. A jet pump as defined by claim 1, wherein the fourth line connection comprises a reducer, in the direction of flow through the fourth line connection draining water from said housing.

* * * * *